INVENTORS
GIUSEPPE RICCIARDI
BORIS UKMAR

BY John Taggenburger
AGENT

INVENTORS
GIUSEPPE RICCIARDI
BORIS UKMAR
BY John Toggenburger
AGENT

INVENTORS
GIUSEPPE RICCIARDI
BORIS UKMAR
BY John Toggenburger
AGENT

INVENTORS
GIUSEPPE RICCIARDI
BORIS UKMAR
BY John Toggenburger
AGENT

United States Patent Office 3,450,835

Patented June 17, 1969

3,450,835

STORING DEVICE FOR CODE COMBINATIONS OF TELEPRINTERS OR SIMILAR MACHINES

Giuseppe Ricciardi and Boris Ukmar, Ivrea, Italy, assignors to Ing. C. Olivetti & C., S.p.A., Ivrea, Italy, a corporation of Italy Filed June 21, 1967, Ser. No. 647,648

Claims priority, application Italy, June 24, 1966, 34,046/66

Int. Cl. H04l *15/28, 15/32*

U.S. Cl. 178—17.5 13 Claims

ABSTRACT OF THE DISCLOSURE

A storing device for code combinations of teleprinters comprises a set of independent memory cells settable stepwise by setting members rotatable concomittantly with a nut and readable by reading members rotatable with a screw engaging said nut which is axially displaceable with respect thereto. The nut when displaced from a rest position causes the reading operation and when it reaches another position locks the keyboard. A pair of additional memory cells causes the shift combination to be automatically transmitted. In a modified embodiment a few combinations on the memory can be read only when a function combination is set up or a memory clearing key is depressed.

*Background of the invention*

This invention relates to a storing device for code combinations of teleprinters or similar machines, comprising a multi-unit memory having settable code elements circumferentially arranged thereon, a set of setting members associated with the units of said code and rotatable stepwise coaxially with said elements upon setting up each combination, and a set of reading members associated with said code units and rotatable stepwise coaxially with said elements upon reading each combination.

There are already known several storing devices of the above type. Generally in these devices upon setting up each combination the memory is displaced stepwise in a first direction together with the reading members, while the reading members are displaced in the opposite direction upon reading each combination.

In a known device, the relative positions of the reading members and the memory is compared by differential mechanism, which is intricate and expensive.

*Summary of the invention*

This disadvantage is obviated by the storing device according to the invention, which is characterized by a rotatable screw element engaging a rotatable nut element, one of said rotatable elements being axially displaceable with respect to the other, means being provided for rotating said displaceable element simultaneously with said setting members and the other rotatable element simultaneously with said reading members, said displaceable element upon reaching each one of a pair of positions being adapted to operate control means for said setting members and said reading members.

This and other characteristics of the invention will become apparent from the following description of a preferred embodiment thereof, and from the accompanying drawings.

*Description of the preferred embodiments of the invention*

Figures 1, 2, 7, 10:
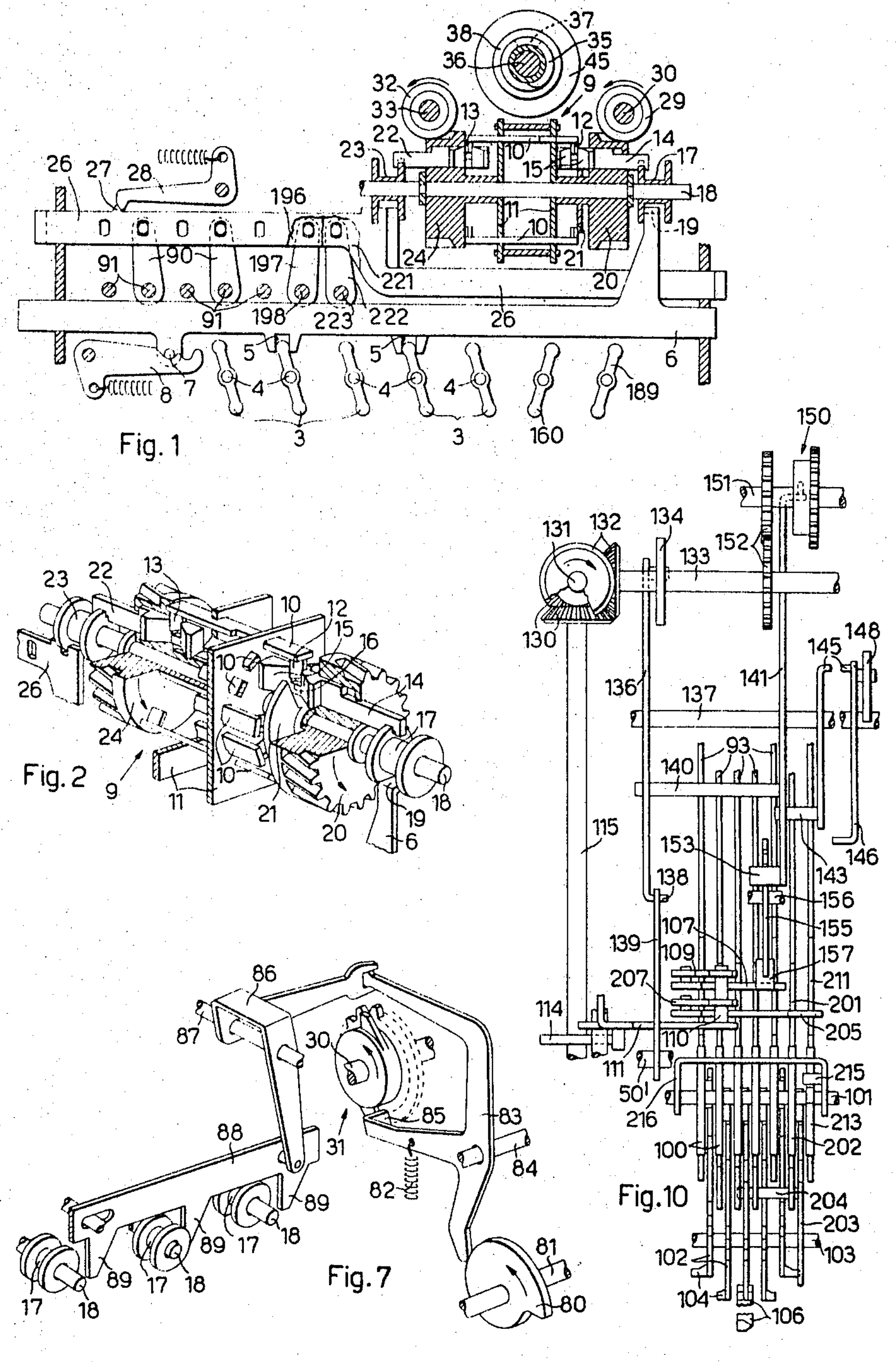
FIG. 1 is a left hand partial longitudinal sectional view of a teleprinter incorporating a storing device according to the invention.
FIG. 2 is a partial perspective view of a detail of the storing device.
FIG. 7 is a partial perspective view of another detail of the storing device.
FIG. 10 is another partial plan view of the storing device.

With reference to the FIG. 1, the numeral 3 indicates a set of five similar code bars of a teleprinter of the start stop type for the five unit code. The bars 3 are rockable about two pivots 4 secured to the ends thereof and rotatably mounted on the machine frame. The bars 3 are selectively settable upon depressing each key of the keyboard in a manner known per se. Each bar 3 engages a notch 5 of a slide 6 longitudinally slidable on the machine frame. Each slide 6 is provided with a pin 7 cooperating with a spring urged locking member 8.

The storing device comprises a set of five independent memory cells, generically indicated by the numeral 9, only one of which is shown in the FIGS. 1 and 2. Each cell 9 (FIG. 2) comprises twelve code elements or slides 10 circumferentially arranged on two stationary plates 11 and provided at each end with a wedge 12 and 13, respectively.

Furthermore, associated with each cell 9 is a setting member or a slide 14 having a pair of surfaces 15 converging toward a notch 16 and adapted to cooperate with the wedge 12. A notch of the slide 14 is engaged by a flange of a sleeve 17 rotatable and axially displaceable on a stationary shaft 18. In turn the sleeve 17 is engaged by a lug 19 of the corresponding slide 6 (FIG. 1). Each slide 14 is slidable in a hole of a worm gear 20 rotatable on the shaft 18. Secured to the gear 20 is a disk 21 (FIG. 2) having a notch allowing each wedge 12 at a time to be axially displaced, the disk 21 being adapted to lock then the wedge 12 in the reached position.

Furthermore in each cell 9 a reading member or a slide 22, identical and symmetrically located with respect to the slide 14 is adapted to cooperate with the wedge 13 of the slides 10. The slide 22 is secured to a sleeve 23 and is slidable in a hole of another worm gear 24. The sleeve 23 and the gear 24 are both rotatable on the same shaft 18. Each sleeve 23 engages a notch of a corresponding slide 26 provided with a projection 27 adapted to cooperate with a spring locking member 28.

The gears 20 of the various cells 9 intermesh each one with a worm 29 (FIG. 3) secured to a shaft 30 rotatable on the machine frame. The shaft 30 is adapted to be cyclically rotated 180 degrees, through a one cycle clutch 31 (FIG. 7), by an electric motor not shown in the drawings. Similarly, the gears 24 (FIG. 1) intermesh each one with a worm 32 secured to another shaft 33 (FIG. 3) rotatable on the machine frame and adapted to be cyclically rotated 180 degrees by another one cycle clutch 34. The transmission ratio between the worms 29 and 32 and the worm gears 20 (FIG. 1) and 24 is 1/6, whereby at each cycle of the shaft 30, 32, the gears 20, 24 are rotated 1/12 of a revolution.

The storing device comprises also a screw 35 (FIG. 3) rotatable on a shaft 36 and a nut 37 integral with a sleeve 38. The screw 35 is secured to a toothed wheel 39 intermeshing with a toothed wheel 40 secured to the shaft 33. The shaft 36 is rotatable on the machine frame and is secured to a toothed wheel 41 intermeshing with a toothed wheel 42 secured to the shaft 30. The shaft 36 is provided with an axial groove 43 engaged by a tooth 44 provided within the sleeve 38, whereby this latter is bodily rotatable with the wheel 41 but is axially displaceable with respect thereto.

The sleeve 38 is provided with a frustum-conical surface 45 normally contacted by a lever 47 fulcrumed on a stationary pivot 48 and urged clockwise by a spring 46. Pivoted on the lever 47 is a rod 49 pin and slot connected with a lever 50 (FIG. 4) secured to a shaft 50′ rotatable on the machine frame. Tensioned between the rod 49 and the lever 50 is a spring 50″ normally holding the lever 50 in the position shown in FIG. 4. Furthermore secured to the shaft 50′ is a second lever 51 linked through a link 52 to an arm 53 fulcrumed at 53′. The arm 53 is provided with a lug 54 normally holding the clutch 34 disengaged.

The lever 47 (FIG. 3) is provided with a projection 55 normally contacted by a pin 57 of a lever 58 fulcrumed on a stationary pivot 59 and urged counterclockwise by a spring 46 prevailing over the spring 56. The lever 58 is provided with a projection 60 adapted to cooperate with a projection 61 of a lever 62 fulcrumed on a stationary pivot 63. The lever 62 is connected to the lever 58 by the spring 56 which normally urges the lever 62 to contact a stationary stop member 64. Another projection 65 of the lever 62 is adapted to cooperate with a second frustum-conical surface 66.

A link 67 links the lever 58 with a lever 68 (FIG. 5) fulcrumed on a stationary pivot 69 and adapted to cooperate with a lever 71 (FIG. 6) fulcrumed at 72. The lever 71 is provided with a lug 73 normally contacted by a lever 75 fulcrumed at 76 and urged clockwise by a spring 78. The lever 75 is secured to a keyboard release key 77 and is provided with a pair of shoulders 74 and 159. The lever 71 is urged by the spring 78 to contact a pin 79 adapted to rock the lever 71 counterclockwise to lock the keyboard when two keys are depressed simultaneously substantially in the manner described in the United States Patent No. 3,306,417, with reference to the pin there indicated by the numeral 44.

The clutch 31 (FIG. 7) is controlled by a lug 85 of a lever 83 fulcrumed on a stationary shaft 84 and urged by a spring 82 to contact a cam 80 secured to a shaft 81 adapted to be cyclically rotated counterclockwise one revolution at the depression of each key of the keyboard. Furthermore the lever 83 is connected to a bail 86 fulcrumed on a stationary shaft 87. Pivoted on the bail 86 is a slide 88 provided with a set of teeth 89 each one adapted to cooperate with the sleeve 17 of the corresponding cell 9.

Each slide 26 (FIG. 1) is pin and slot connected to a corresponding arm 90 secured to a shaft 91 rotatable on the machine frame. Secured to each shaft 91 is a second arm 92 (FIG. 8) in turn pin and slot connected to a corresponding slide 93 slidable on two stationary comb plates 94 and 95. Each slide 93 is adapted to assume selectively the mark position shown by solid lines in FIG. 8 or the space position shown by broken lines.

Furthermore, each slide 93 is provided with a pair of shoulders 96 and 97 adapted to cooperate with a pair of arms 98 and 99 of a corresponding lever 100. The levers 100 are fulcrumed on a stationary shaft 101 and are each one connected to a corresponding bar 102 slidable on two stationary pins 103. Each bar 102 is provided with a projection 104 engaging a notch 105 of a corresponding slide 106. The slides 106 are serially read to transmit the code combination set up therein in a manner known per se.

The five slides 93 enter an aperture provided on a first actuator formed of a plate 107 vertically slidable within two notches 108 provided on the machine frame. The plate 107 is linked with a lever 109 fulcrumed on a pivot 110 secured to a lever 111. This latter is fulcrumed on a stationary shaft 112 and is normally urged by a spring 113 to contact a cam 114 secured to a conventional transmission shaft 115. A spring 116 tensioned between a lug 117 of the lever 111 and the lever 109 normally urges a pin 118 of the lever 109 to contact a latch 119 slidably mounted on a stationary shaft 120.

Furthermore, fulcrumed on the shaft 112 is a lever 121 normally urged by a spring 122 to contact another cam 123 of the shaft 115. The lever 121 is provided with a slot 124 entered by a pin 125 of a knife plate 126 adapted to cooperate with a tooth 127 provided on each bar 102. A spring 129 is tensioned between the pin 125 and a second pin 128 of the lever 121.

The transmission shaft 115 is connected through a pair of bevel gears 130 (FIG. 10) to a vertical shaft 131. This latter is connected through a second pair of bevel gears 132 to a transverse shaft 133 rotatable on the machine frame. Secured to the shaft 133 is a cam 134 (FIG. 9) having a depression 134′ normally contacted by a lever 136 fulcrumed on a stationary shaft 137 and urged clockwise by a spring 135. The lever 136 is provided with a lug 138 adapted to cooperate with another lever 139 secured to the shaft 50′.

A pin 140 of a lever 141 fulcrumed on the shaft 137 is adapted to cooperate with the lever 136. The lever 141 is normally urged by a spring 142 to contact a pin 143 secured to an arm 144 of a bail 145 fulcrumed on the shaft 137. The bail 144 is provided with another arm 146 normally urged by a spring 147 to contact a cam 148 of the shaft 33.

The lever 141 is provided with a lug 149 controlling a one cycle clutch 150, which when engaged it causes a shaft 151 to rotate counterclockwise one revolution. A pair of gears 152 connect the shaft 151 to the shaft 133. The lever 141 is finally provided with a lug 153, normally contacted by a latch 155 fulcrumed at 156 and urged clockwise by a spring 154. The latch 155 is adapted to cooperate with a lug 157 of the plate 107.

The storing device operates as follows.

A depression of each key of the keyboard effects a cycle of the shaft 81 (FIG. 7) to selectively position the code bars 3 (FIG. 1) according with the code combination of the depressed key. Then the slides 6 through the sleeves 17 position the corresponding slides 14. Thereafter the cam 80 (FIG. 7) causes the spring 82 to rock the lever 83 counterclockwise, whereby the bail 86 displaces the slide 88 leftwards. However, this latter is effectively displaced only if all the sleeves 17 reach the due position. In this case the lever 83 causes the clutch 31 to be engaged.

The shaft 30 is now rotated counterclockwise bodily with the worms 29 (FIG. 3) which rotate all gears 20 (FIG. 2) counterclockwise one step bodily with the slides 14. Then these latter engage the wedges 12 of the slides 10, thus storing the code combinations in the cells 9. In the meanwhile the cam 80 restores the lever 83 bodily with the bail 86 and the slide 88, thus disengaging the clutch 31 (FIG. 7) at the end of its cycle. Therefore by successively depressing different keys, for each cycle of the shaft 81, the shaft 30 causes a slide 10 of each cell 9 to be set up.

Figure 9:
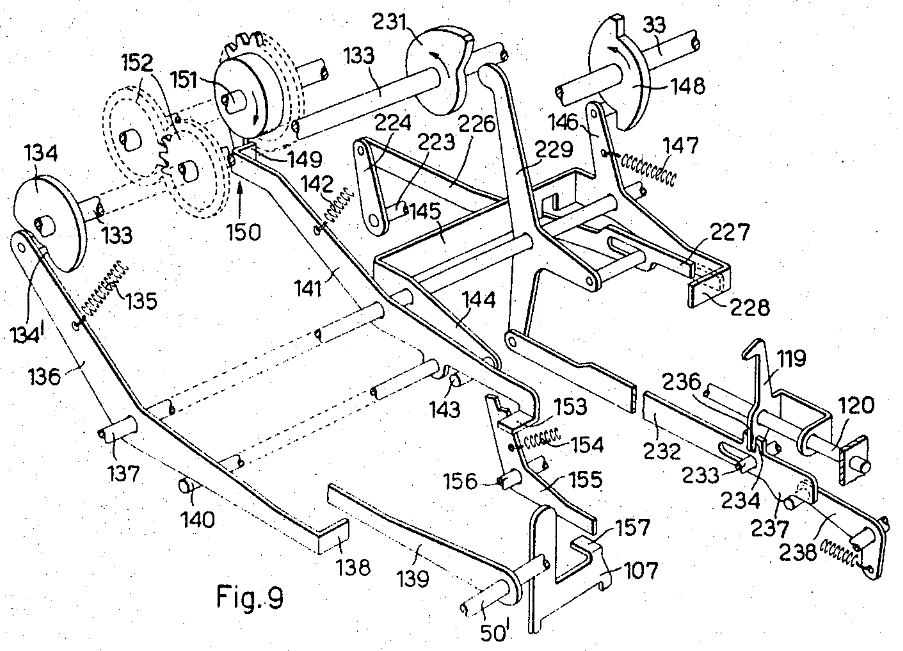
FIG. 9 is another partial perspective view of the storing device.

The shaft 30 through the toothed wheels 42 and 41 (FIG. 3) rotates the shaft 36 (FIG. 1) clockwise bodily with the sleeve 38, which is thus displaced rightwards (FIG. 3) one step from the rest position shown in the drawings. The surface 45 releases thus the lever 47, which is rocked clockwise by the spring 46 until contacting a stationary stop member 158, thus releasing the pin 57 of the lever 58. However the projection 60 of the lever 58 is stopped by the projection 61 of the lever 62. Then the rod 49 (FIG. 4), through the spring 50″ and the lever 50, rotates the shaft 50′ counterclockwise, bodily with the levers 51 and 139 (FIG. 9).

The lever 50 (FIG. 4) through the link 52 rocks the arm 53 counterclockwise, whereby the lug 54 releases the clutch 34 to effect a cycle of the shaft 33. Now the worms 32 (FIG. 3) rotate all the gears 24 (FIG. 2) counterclockwise one step bodily with the slides 22. Then these latter read the wedge 13 of the corresponding slides 10 and are axially displaced bodily with the sleeves 23 and the slides 26, which through the arm 90, the shafts 91 and the arms 92 (FIG. 8), position the corresponding slides 93. During the cycle of the shaft 33 (FIG. 3) through the wheels 40 and 39 the screw 35 (FIG. 1) is rotated clockwise, whereby the sleeve 38 (FIG. 3) is returned leftwards one step.

Thereafter the cam 148 (FIG. 9) of the shaft 33 rocks the bail 145 counterclockwise, and through the pin 143 rocks the lever 141 counterclockwise. The lever 141 is now locked in the rocked position by the latch 155, whereas at the end of the cycle of the shaft 33 the bail 145 is restored by the spring 147. In turn the pin 140 of the lever 141 rocks the lever 136 counterclockwise whereby the lug 138 engages the crank lever 139, which is restored together with the shaft 50′ and the levers 50 and 51 (FIG. 4), thus tensioning the spring 50″ and disengaging the clutch 34.

Figures 3, 4, 5, 6:
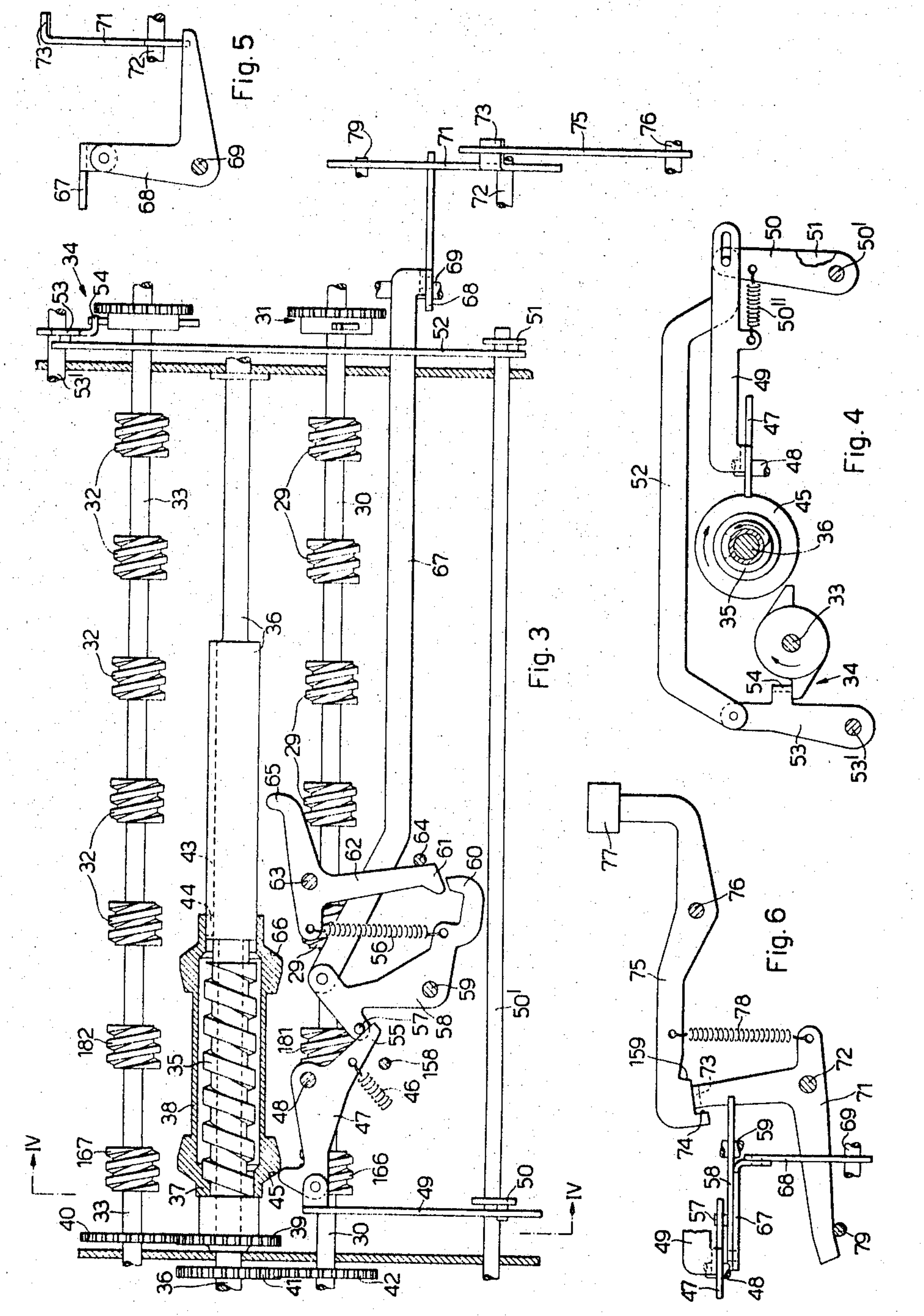
FIG. 3 is a partial plan view of the storing device.
FIG. 4 is a sectional view taken according to the line IV—IV of FIG. 3.
FIG. 5 is a front view of a detail of FIG. 3.
FIG. 6 is a longitudinal sectional view of another detail of FIG. 3.

The lever 141 (FIG. 9) when rotated counterclockwise causes the clutch 150 to be engaged, whereby through the wheels 152 a cycle of the shaft 133 is started. The shaft 133 through the bevel gears 130 and 132 (FIG. 10) rotates the transmission shaft 115 (FIG. 8) one revolution counterclockwise. Now the lever 136 (FIG. 9) is held in the reached position by the pin 140 and through the lug 138 prevents the lever 139 from rotating counterclockwise, thus preventing the further engagement of the clutch 34 (FIG. 3).

Now furthermore the cam 114 (FIG. 8) of the shaft 115 rocks the lever 111 counterclockwise, whereby the pin 110 rocks the swing lever 109 about the pin 118 and moves the plate 107 upwards together with the slides 93. One of the shoulders 96 and 97 of each slide 93 engages the corresponding arm 98 or 99, and selectively rocks the lever 100 in either direction, thus correspondingly positioning the bar 102 together with the slide 106. Simultaneously the lug 157 of the plate 107 engages the latch 155 (FIG. 9), which is thus rocked counterclockwise and releases the lever 141. This latter is restored by the spring 142, thus predisposing the disengagement of the clutch 150. Then the pin 140 releases the lever 136, but, while now the cam 134 presents the higher position of its contour, it causes the lug 138 to remain in the preceding position, thus preventing the clutch 34 (FIG. 3) from being engaged until near the end of the cycle of the shaft 133 (FIG. 9), namely throughout the whole duration of the transmission over the telegraph line of the read combination.

Thereafter the cam 123 (FIG. 8) of the shaft 115 rocks the lever 121 clockwise pulling down the knife 126, which then locks the bars 102 in the reached position. The position of the five slides 106 is now sensed for serially sensing the signals corresponding to the read code combination over a telegraph line in a known manner.

Near the end of the cycle of the clutch 150 (FIG. 9), the depression 134′ of the cam 134 causes the lever 136 to be restored by the spring 135, whereby the lug 138 releases the lever 139. When the sleeve 38 is restored to the position of FIG. 3, that is if the memory is cleared, the lever 47 is locked again by the surface 45 and the clutch 34 remains disengaged. On the contrary if some combinations are still set up in the memory, the sleeve 38 is still located rightwards with respect to the position of FIG. 3 and the lever 47 may be rocked again clockwise, thus causing a new cycle of the clutch 34 (FIG. 4) which is followed by a cycle of the clutch 150. Since the setting cycle of the clutch 31 is speedier than the transmission cycle of the clutch 150, the operator may set up the code combinations at a variable speed but the storing device will enable the machine to transmit uninterruptedly over the line.

If the sleeve 38 reaches an axial position corresponding to ten memorized code combinations, that is the setting slide 10 (FIG. 2) to be read in each cell is adjacent to the slide 10 to be set, the surface 66 (FIG. 3) engages the projection 65 and rocks the lever 62 clockwise. Since then the projection 60 contacts the projection 61, the lever 62 is latched in the rocked position by the projection 60 of the lever 58. Consequently the rod 67 is displaced leftwards and rocks the lever 68 (FIG. 5) counterclockwise.

The lever 68 (FIG. 6) in turn rocks clockwise the lever 71 which locks the keyboard, thus warning the operator that the memory capacity has been overcome. The lever 71 is now locked in reached position by the shoulder 159 of the lever 75, while the lever 47 (FIG. 3) causes the clutch 34 to be repeatedly engaged until the memory is cleared.

As long as the sleeve 38 is not restored to the position of FIG. 3, the lever 71 (FIG. 6) is held in the rocked position directly by the lever 68 (FIG. 5) since the spring 56 (FIG. 3) prevails over the spring 78 (FIG. 6). When the surface 45 positively returns the lever 47 to the position of FIG. 3, the lever 47 engages the pin 57 and rocks the lever 58 counterclockwise thus releasing the lever 62. The rod 67 is now displaced rightwards and through the lever 68 (FIG. 5) it releases the lever 71. Now the key 77 (FIG. 6) may be depressed to cause the spring 78 to restore the lever 71 thus unlocking the locked keyboard.

The storing device comprises also a mechanism for automatically generating the code combinations of the letter-figure shift. To this end a conventional shift bar 160 (FIGS. 1 and 11), adjacent to the code bars 3 and similar thereto, assumes either the position shown by solid lines in FIG. 11 when a figure key or the figures shift key is depressed, or the position shown by broken lines when the letter or the letters shift key is depressed. The shift bar 160 is connected to a slide 161 having a pin 162 cooperating with a spring urged locking member 163. The slide 161 is provided with a lug 164 cooperating with a sixth memory cell identical to the cells 9 and not shown in the drawings. The sixth cell cooperates with two worms 166 and 167 (FIG. 3) secured to the shafts 30, and 33 respectively.

Moreover the slide 161 (FIG. 11) is provided with a projection 168 adapted to cooperate with a tooth 169 of a lever 171 fulcrumed on a stationary shaft 172. The lever 171 is provided with a projection 173 adapted to cooperate with a spring urged locking member 174 and is connected through a pin 176 to a bail 177 rotatable on the shaft 172. The bail 177 is pin and slot connected to an auxiliary slide 178 provided with a lug 179 cooperating with a seventh memory cell not shown and cooperating with two worms 181 and 182 (FIG. 3) of the shafts 30 and 33. Furthermore, the slide 178 (FIG. 11) is pin and slot connected with an arm 183 of a bail 184 rotatable on a stationary shaft 186 and provided with a second arm 187 adapted to cooperate with a cam 188 of the shaft 30.

Figures 8, 11:
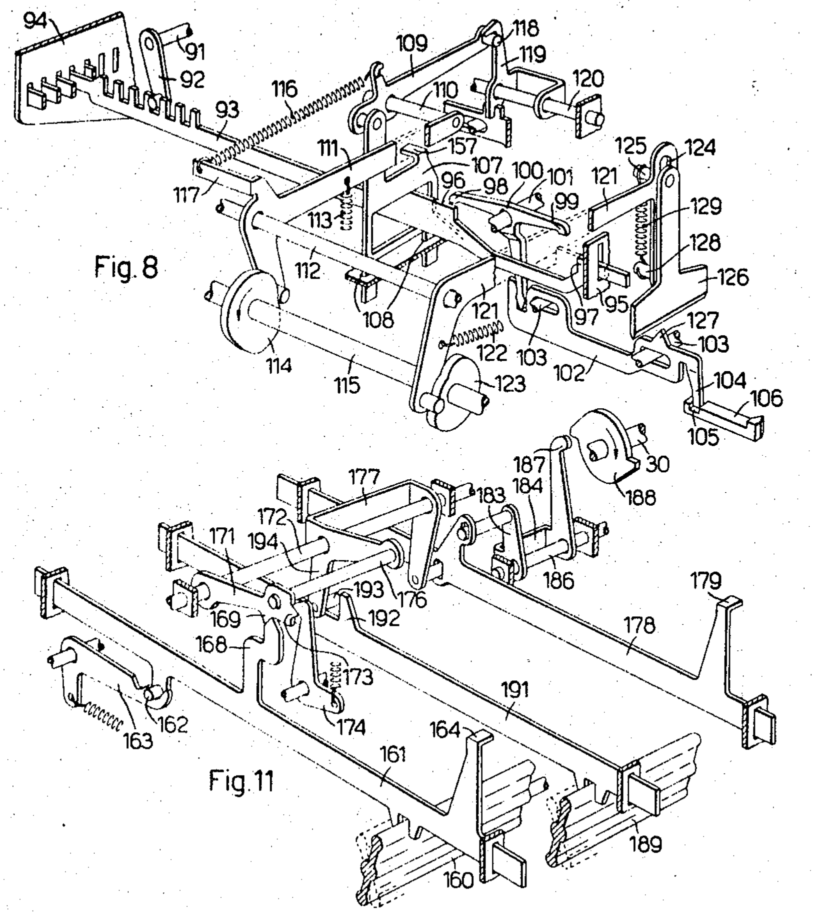
FIG. 8 is another partial perspective view of the storing device.
FIG. 11 is another partial perspective view of the storing device.

Located adjacent to the bar 160 is another setting bar 189 which may assume the position shown by solid lines in FIG. 11, upon depressing any machine key but the two case shift keys. On the contrary when one of the case shift keys is depressed, the bar 189 assumes the position shown indicated by broken lines in FIG. 11. The bar 189 is connected to a slide 191 provided with a projection 192 adapted to cooperate with a pin 193 secured to an arm 194 of the bail 177.

Figure 12:
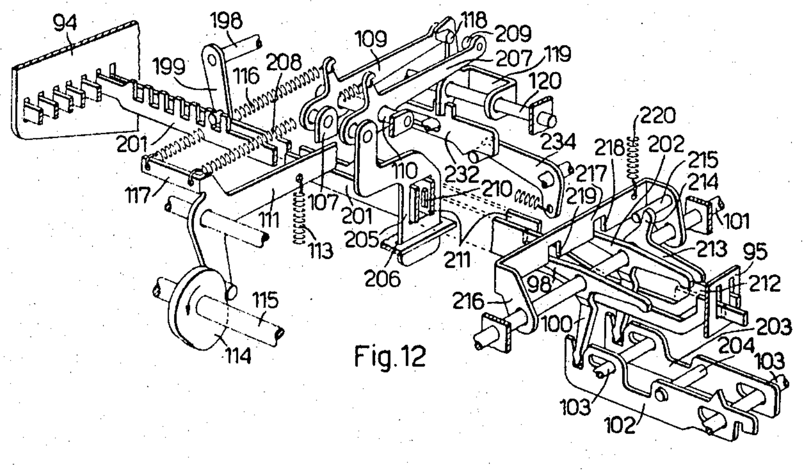
FIG. 12 is another partial perspective view of the storing device.

Associated with the sixth memory cell is a bar 196 (FIG. 1) identical to the bars 26 and pin and slot connected with an arm 197, which through a shaft 198 is secured to another arm 199 (FIG. 12). In turn this latter is connected to a slide 201 identical to the slides 93 (FIG. 8) and slideable on the two comb plates 94 and 95. The slide 201 is adapted to be read by a lever 202 identical to the levers 100 and connected to an additional bar 203, which is connected through a pin 204 to the bar 102 associated to the third code unit.

The slide 201 engages a recess of a second actuator formed of a plate 205 vertically slidable within a notch 206 of the machine frame and fulcrumed on another lever 207 fulcrumed on the pivot 110. The lever 207 is connected by a spring 208 to the lug 117 of the lever 111 and is provided with a pin 209 adapted to cooperate with the latch 119. The plate 205 is provided with a projection 210 engaging a notch of another slide 211 vertically slidable on the comb plates 94 and 95 and provided with one shoulder 212 only normally contacted by a lever 213 fulcrumed on the shaft 101. The lever 213 is provided with a projection 214 normally contacted by a pin 215 of a bail 216 fulcrumed on a shaft 101 and urged clockwise by a spring 220. The bail 216 is provided with a transverse portion 217 adapted to cooperate with the arms 98 of the levers 100. The transverse portion 217 is provided with a pair of notches 218 and 219 in correspondence with the lever 202, and the lever 100 of the third code unit respectively.

Associated with the seventh memory cell is a bar 221 (FIG. 1) identical to the bars 26 and pin and slot connected to an arm 222, which through a shaft 223 is secured to an arm 224 (FIG. 9). This latter is linked with a link 226 provided with a projection 227 adapted to cooperate with a lug 228 of the bail 145. The link 226 is also pin and slot connected with a lever 229 pivoted on the shaft 137 and adapted to cooperate with a cam 231 of the shaft 133. Furthermore the lever 229 is connected to a slide 232 slidable on a stationary pin 233 and provided with a notch 234 engaging a projection 236 of the latch 119. The slide 232 is also provided with a projection 237 cooperating with a spring urged locking member 238.

Assuming that the last set up code combination was a figure character, the bars 160 and 189 are located in the position shown by solid lines in FIG. 11. If now a letter key is depressed, the case shift bar 160 is rocked in addition to the code bars 3 (FIG. 1) to the position shown by broken lines in FIG. 11. The slide 161 is thus displaced rearwards to set up accordingly the sixth memory cell. Furthermore, the projection 168 causes the lever 171 to be rocked counterclockwise, the lever 171 being now locked in the rocked position by the locking member 174. The lever 171 through the pin 176 rocks the bail 177, thus displacing the slide 178 forwards to set accordingly the seventh memory cell. In turn the arm 187 of the bail 184 contacts the cam 188 of the shaft 30, which near the end of the cycle, upon having set up the code combination and the shift signal in the cells 9, rocks the bail 184 counterclockwise, thus restoring the slide 178, the bail 177 and the lever 171 to the position of FIG. 11, whereas the slide 161 remains displaced rearwards.

Upon reading the cells 9 so set up, as above described, the slide 201 is displaced rearwards to the position shown by broken lines in FIG. 12. In turn the link 226 (FIG. 9) is displaced forwards bringing the projection 227 above the lug 228 of the bail 145 as shown by broken lines in FIG. 9. Near the end of the cycle of the shaft 33, when the cam 148 rocks the bail 145 counterclockwise to engage the clutch 150, the lug 228 rocks the link 226 counterclockwise together with the lever 229. This latter contacts now the cam 231 of the shaft 133 and displaces the slide 232 forwards. The slide 232 then displaces the latch 119 forwards and is locked in the reached position by the locking member 238. The pin 209 (FIG. 12) is thus engaged by the latch 119 of the swing lever 207. Thereafter the bail 145 is restored by the spring 147. Then, when the cam 114 (FIG. 12) of the shaft 115 rocks the lever 111 counterclockwise, the lever 109 being no longer locked by the latch 119 does not affect the plate 107, whereby the code combination represented by the slides 93 (FIG. 8) is not transferred to the bars 102. On the contrary the lever 207 (FIG. 12) is rocked about the pin 209 and displaces the plate 205 upwards together with the slides 201 and 211.

According to the CCITT five-unit code, the "Letters" code combination is formed by five mark impulses, while the "Figures" code combination, differs from the former only in the third code unit which is a space impulse. The slide 201 when displaced upwards rocks the lever 202 counterclockwise displacing the bar 203 forwards bodily with the bar 102 of the third code unit. In turn the slide 211 rocks the lever 213 counterclockwise together with the bail 216 thus rocking the other four levers 100 counterclockwise. All the bars 102 thus assume the position corresponding to the "Letters" code combination, which is then transmitted on the line.

Near the end of the transmission cycle, the cam 231 (FIG. 9) of the shaft 133 restores the lever 229 and the slide 232, whereby the latch 119 engages again the pin 118 (FIG. 12) of the lever 109. Since the lever 141 (FIG. 9) is still locked by the latch 155, the clutch 150 is not disengaged and effects a second transmission cycle, during which the code combination set up on the slides 93 (FIG. 8) is transferred to the bars 102 and the lever 141 is released from the latch 155 by the lug 157 of the plate 107, as previously described.

Similarly, if a code combination of a figure is set up when the slide 161 (FIG. 11) is displaced rearwards the bar 160 is returned to the position of FIG. 11 to set accordingly the sixth memory cell. In turn the slide 178 is returned forwards to accordingly set the seventh memory cell. Upon reading the cells 9, the link 226 (FIG. 9), through the lever 229 and the slide 232, will cause the latch 119 to engage again the pin 209 (FIG. 12), whereby during a first transmission cycle the slides 201 and 211 are raised. The slide 201 which was returned to the position of FIG. 12, through the lever 202 and the bar 203, causes the bar 102 of the third code unit to return rearwards, while the slide 211 through the lever 213 and the bail 216 displaces forwards the other four bars 102, whereby the "Figures" code combination is now transmitted. The code combination set up on the cells 9 is then transmitted during a second transmission cycle as in the preceding case.

If the "Letters" or "Figures" shift code are directly set up by the conventional shift keys, the automatic transmission cycle for the case shift code is prevented. To this end, it is noted that the "Figures" key when depressed locates the bar 160 in the position of FIG. 11, whereas the "Letters" key locates same in the position shown by broken lines. In both cases the slide 178 is temporarily displaced forwards, while the bar 189 is displaced to the position shown by broken lines, thus displacing the slide 191 rearwards. Then the projection 192 engages the pin 193, thus returning the bail 177 counterclockwise, whereby the slide 178 is returned rearwards before the cycle of the shaft 30 is started. Therefore the slide 178 does not affect the seventh cell and the latch 119 (FIG. 9) is not affected by the bail 145. The case shift code combination is thus read on the memory cells 9 (FIG. 1) and is directly transmitted on the line.

Figure 13:
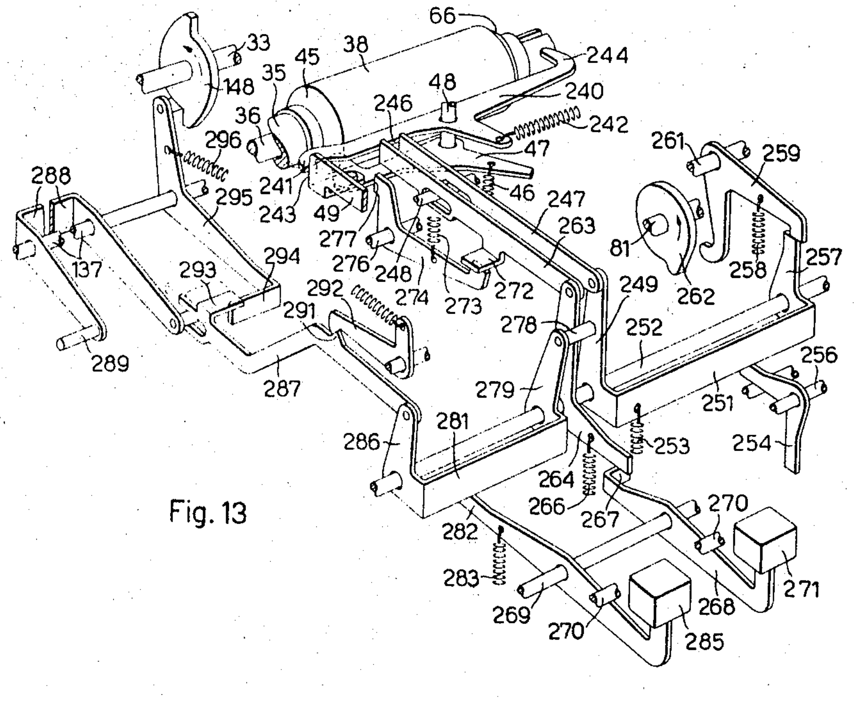
FIG. 13 is a partial perspective view of a modified embodiment of the device.

According to a modified embodiment of the invention the code combinations set up on the memory cells 9 are read for example after three code combinations have been set up in order to give the operator the possibility of correction, when he realizes that the key just depressed is wrong. To this end, fulcrumed on the pivot 48 (FIG. 13) is also a lever 240 provided with a projection 241 normally urged by a spring 242 to contact a shoulder 243 of the rod 49, the spring 242 prevailing over the spring 46 of the lever 47. Furthermore the lever 240 is provided with a second projection 244 located on the path of the surface 66 of the sleeve 38, this latter having now a constant section between the two surfaces 45 and 66. More particularly, the projection 244 is normally distanced from the surface 66 of the sleeve 38 three steps.

A slide 247 slidable on a stationary pin 248 and connected to an arm 249 of a bail 251 is provided with an end adapted to cooperate with an edge 246 of the lever 240. The bail 251 is fulcrumed on a stationary shaft 252 and is normally urged by a spring 253 to contact a lever 254 fulcrumed at 256 and adapted to be rocked clockwise at the depression of a function key, for example, the return key, the line feed key, the space bar etc. A second arm 257 of the bail 251 is normally contacted by a latch 259 fulcrumed at 261 and urged clockwise by a spring 258, the latch 259 being adapted to cooperate with a cam 262 of the shaft 81.

A second slide 263 slidable on the pin 248 and connected to a lever 264 is also adapted to cooperate with the edge 246 of the lever 240. The lever 264 is pivoted on the shaft 252 and is normally urged by a spring 266 to contact a lug 267 of a lever 268 fulcrumed on a stationary shaft 269. The lever 268 normally contacts a stationary shaft 270 and carries a key 271 adapted to cause the memory to be read. The slide 263 is provided with a lug 272 cooperating with a latch 274 fulcrumed at 276 and provided with a shoulder 277 urged by a spring 273 to contact the lever 47.

The lever 264 may cooperate with a pin 278 secured to an arm 279 of a bail 281 also fulcrumed on the shaft 252. The bail 281 is adapted to cooperate with a lever 282 carrying a correction key 285 and pivoted on the shaft 269, the lever 282 being normally urged by a spring 283 to contact the shaft 270.

Fulcrumed on another arm 286 of the arm 281 is a slide 287 pin and slot connected to a bail 288 fulcrumed on the shaft 137. The bail 288 is provided with a pin 289 adapted to cooperate with the lever 141 (FIG. 9) in a manner similar to the pin 143 of the bail 145. The slide 287 (FIG. 13) is provided with a projection 291 cooperating with a spring urged locking member 292. A lug 293 of the slide 287 is normally urged by the spring 142 (FIG. 9) of the lever 141 to contact a lug 294 (FIG. 13) of a lever 295 fulcrumed on the shaft 137. The lever 295 is normally urged by a spring 296 to contact the cam 148 of the shaft 33, whereas its lug 294 is adapted to cooperate with the projection 227 (FIG. 9) of the link 226 in a manner similar to the lug 228 of the bail 145.

At each cycle of the shaft 33, the cam 148 through the lever 295 and the slide 287, rocks the bail 288 counterclockwise, thus causing the engagement of the clutch 150 (FIG. 9) for a transmission cycle. Normally, when the sleeve 38 starts the rightward displacement, the surface 45 releases the lever 47, which is prevented from rocking clockwise by the shoulder 243 of the rod 49. Upon having set up three code combinations, the surface 66 of the sleeve 38 engages the projection 244, thus rocking the lever 240 clockwise. The lever 47 is now rocked and causes the memory to be read in the manner above described. When the surface 66 releases the lever 240, the spring 242 prevails over the spring 46 and restores the lever 47, thus preventing the memory from being completely cleared. Therefore, in the memory always remains stored at least three code combinations to be read, whereby if the operator realizes to have depressed a key erroneously the correction may be effected in a manner to be described. However, the memory will be completely read till the last set up code upon depressing any function key which rocks the lever 254 clockwise. Then the lever 254 causes the bail 251 to be rocked counterclockwise thus displacing the slide 247 rearwards, the bail 251 being locked in the rocked position by the latch 259. The lever 240 is now rocked clockwise and releases the lever 47, which causes the last three code combinations of the memory to be read and transmitted. The bail 251 is released upon depressing any alphanumeric key which does not affect the bail 254. Then in fact the shaft 81 is rotated counterclockwise one cycle, whereby the cam 262 rocks the latch 269 counterclockwise thus releasing the arm 257 of the bail 251.

The memory may be also completely read at the depression of the key 271, which through the lug 267 of the lever 268 rocks the lever 264 counterclockwise. The slide 263 is now displaced rearwards and rocks the lever 240 clockwise, whereby the lever 47 causes the memory to be read as in the preceding case. Furthermore, the lever 47 causes now the latch 274 to be rocked counterclockwise thus locking the lug 272 of the slide 263 in the displaced position. The slide 263 will be automatically released when the sleeve 38 will return leftwards. Then the surface 45 will restore the lever 47 which engages the projection 277 thus returning the latch 274 clockwise and causing the slide 263 to be restored by the spring 266 of the lever 264. The erroneous combinations may be cancelled by depressing the correction key 285, whereby the lever 282 rocks the bail 281 counterclockwise. Now the pin 278 of the bail 281 rocks the lever 264 clockwise as in the above case. Simultaneously the bail 281 displaces the slide 287 rearwards to the position shown by broken lines in FIG. 13 thus removing the lug 293 from the lug 294 of the lever 295. Now, when the cam 148 of the shaft 33 rocks the lever 295 counterclockwise, the bail 288 is not rocked and therefore the transmission clutch 150 (FIG. 9) is not engaged. The memory is thus so cleared, but the last three code combinations of the memory are not transmitted.

What is claimed is:

1. A storing device for code combinations of teleprinters or similar machines, comprising a multiunit memory having settable code elements circumferentially arranged thereon, a set of setting members associated with the units of said code and rotatable stepwise coaxially with said elements upon setting up each combination, and a set of reading members associated with the units of said code and rotatable stepwise coaxially with said elements upon reading each combination, wherein the improvement comprises:

(a) a rotatable screw element, (b) a rotatable nut element engaging said rotatable screw element and axially displaceable with respect thereto, (c) power means for rotating said displaceable element simultaneously with said setting members and the other rotatable element simultaneously with said reading members, (d) and control means operable by said displaceable element upon reaching each one of a pair of positions for controlling said setting members and said reading members.

2. A device according to claim 1, comprising in combination:

(e) a set of independent memory cells comprised in said multiunit memory, each one of said cells having a number of said code elements circumferentially arranged thereon, (f) and means for causing said setting members and said reading members to sequentially cooperate with said code elements.

3. A device according to claim 1, comprising in combination:

(e) a normally ineffective reading control member comprised in said control means and adapted to be rendered effective when said displaceable element is displaced out of one of said pair of positions, (f) and a normally ineffective set up locking member comprised in said control means and adapted to be rendered effective by said displaceable element upon reaching the other position of said pair.

4. A device according to claim 2 comprising in combination:

(g) a set of code bars, (h) a set of transfer members conditionable for transferring a code combination read by said reading members to said code bars, (i) an additional setting member adapted to assume one of two positions to indicate the Letters-Figures shift conditions, (j) an auxiliary setting member normally located in a first location and adapted to be temporarily displaced by said additional setting member to a second location each time it is displaced from one to the other of said two positions, (k) a pair of further memory cells adapted to be set by said additional setting member and said auxiliary setting member respectively, (l) and a pair of further transfer members adapted to be positioned according to said further memory cells.

5. A device according to claim 3, comprising in combination:

(g) a latch for latching said set up locking member in the effective position, (h) a manually controlled member for causing said latch to release said set up locking member, (i) and yieldable means urging said reading control member to prevent said set up locking member from being rendered ineffective till said displaceable element is not returned to said first position.

6. A device according to claim 3, comprising in combination:

(g) a first cyclically operating mechanism conditionable for operation by said reading control member, (h) a set of transfer members adapted to be positioned by said first mechanism under the control of said reading members, (i) a second cyclically operating mechanism conditionable for operation by said first mechanism, (j) and a set of code bars settable by said second mechanism under the control of said transfer members.

7. A device according to claim 3, comprising in combination:

(g) an auxiliary control member normally holding said reading control member in an ineffective position and adapted to be rendered positively ineffective by said displaceable element upon being displaced a predetermined stroke, (h) and a manipulative function control member adapted to control a specific machine function and simultaneously render ineffective said auxiliary control member irrespectively from the position of said displaceable element.

8. A device according to claim 6, comprising in combination:

(k) a cam comprised in said second mechanism and adapted to prevent said first mechanism from being further operated during the cycle of said second mechanism, (l) and a trip member yieldably operable by said reading control member for so conditioning said first mechanism.

9. A device according to claim 8, comprising in combination:

(m) an additional setting member adapted to assume one of two positions to indicate the Letters-Figures shift conditions, (n) an auxiliary setting member normally located in a first location and adapted to be temporarily displaced by said additional setting member to a second location each time it is displaced from one to the other of said two positions, (o) a pair of further memory cells adapted to be set by said additional setting member and said auxiliary setting member respectively, (p) a pair of further transfer members adapted to be positioned according to said further memory cells, (q) a further bar associated with the transfer member of said pair corresponding to said additional setting member, said further bar being bodily movable with the code bar of the third code unit, (r) a first actuator normally effective for transferring each code combination from said set of transfer members to said code bars, (s) a normally ineffective second actuator adapted to be rendered effective alternately with said first actuator by said corresponding transfer member for causing said further pair of transfer members to control said code bars according to the case shift code combination, (t) a latch adapted to latch said trip member in the operated position and to be rendered ineffective by said first actuator upon being so operated, (u) and means operable upon manually setting up a case shift code combination to prevent said auxiliary setting member from being operated.

10. A device according to claim 8, comprising in combination:

(m) an auxiliary control member normally holding said reading control member in an ineffective position and adapted to be rendered positively ineffective by said displaceable element upon being displaced a predetermined stroke, (n) an additional manually operable member also adapted to render ineffective said auxiliary control member, (o) a latch for latching said additional manually operable member in the operated position, said latch being disabled by said displaceable element when returned to said one position, (p) and a correction control member operable to cause said additional manually operable member to be operated and to prevent said first mechanism for conditioning said second mechanism for operation.

11. A device according to claim 4, comprising in combination:

(m) a further bar associated with the transfer member of said pair corresponding to said additional setting member, said further bar being bodily movable with the code bar of the third code unit, (n) and means for causing said further transfer members to position the other code bars of said set into the mark position to automatically transfer the case shift code combination before transferring the character combination without setting the case shift combination on said memory.

12. A device according to claim 4, comprising in combination:

(m) a further bar associated with the transfer member of said pair corresponding to said additional setting member, said further bar being bodily movable with the code bar of the third code unit, (n) a first actuator normally effective for transferring each code combination from said set of transfer members to said code bars, (o) and a normally ineffective second actuator adapted to be rendered effective alternately with said first actuator by said corresponding transfer member for causing said further pair of transfer members to control said code bars according to the case shift code combination.

13. A device according to claim 7, comprising in combination:

(i) an additional manually operable member also adapted to render ineffective said auxiliary control member, (j) and a latch for latching said additional manually operable member in the operated position, said latch being disabled by said displaceable element when returned to said one position.

References Cited

UNITED STATES PATENTS

| | | |
|---|---|---|
| 3,110,014 | 11/1963 | Seyforth. |
| 3,205,305 | 9/1965 | Clark et al. |

THOMAS A. ROBINSON, *Primary Examiner.*

U.S. Cl. X.R.

178—33